(12) United States Patent
Mendoza Gómez et al.

(10) Patent No.: US 9,782,764 B2
(45) Date of Patent: Oct. 10, 2017

(54) PROCEDURE FOR OBTAINING A SUBSTRATE WITH AU NANOCLUSTERS ATTACHED TO ITS SURFACE, AND THE SUBSTRATE AND CATALYST OBTAINED THROUGH THIS PROCEDURE

(71) Applicant: UNIVERSITAT POLITÈCNICA DE CATALUNYA, Barcelona (ES)

(72) Inventors: Ernest Mendoza Gómez, Barcelona (ES); Jordi Llorca Piqué, Barcelona (ES)

(73) Assignee: UNIVERSITAT POLITÈCNICA DE CATALUNYA, Barcelona (ES)

( * ) Notice: Subject to any disclaimer, the term of this patent is extended or adjusted under 35 U.S.C. 154(b) by 438 days.

(21) Appl. No.: 14/347,098

(22) PCT Filed: Oct. 17, 2012

(86) PCT No.: PCT/ES2012/070722
§ 371 (c)(1),
(2) Date: Mar. 25, 2014

(87) PCT Pub. No.: WO2013/057349
PCT Pub. Date: Apr. 25, 2013

(65) Prior Publication Data
US 2014/0228201 A1 Aug. 14, 2014

(30) Foreign Application Priority Data

Oct. 17, 2011 (ES) .................................. 201131660

(51) Int. Cl.
*B01J 37/34* (2006.01)
*B01J 37/02* (2006.01)
(Continued)

(52) U.S. Cl.
CPC .......... *B01J 37/0215* (2013.01); *B01J 23/52* (2013.01); *B01J 35/002* (2013.01);
(Continued)

(58) Field of Classification Search
CPC ........................ B01J 37/0215; B01J 37/0072; B01J 37/0201; B01J 37/343; B01J 35/0013;
(Continued)

(56) References Cited

U.S. PATENT DOCUMENTS

2006/0014068 A1* 1/2006 Boysen ................. B82Y 30/00
429/535
2010/0167914 A1* 7/2010 Anderson ............. B01J 21/063
502/80

FOREIGN PATENT DOCUMENTS

CN 102107851 A * 6/2011

OTHER PUBLICATIONS

Alves et al. "Synthesis and Stabilization of Subnanometric Gold Oxide Nanoparticles on Multiwalled Carbon Nanotubes and Their Catalytic Activity" J. Am. Chem. Soc., 2011, 133 (26), pp. 10251-10261, Jun. 2, 2011.*
(Continued)

*Primary Examiner* — Haytham Soliman
(74) *Attorney, Agent, or Firm* — Senniger Powers LLP

(57) ABSTRACT

Method for producing a substrate with Au (gold) nanoclusters affixed to the surface thereof and substrate and catalyst obtained by means of said method. The method consists in preparing a solution containing, in disperse form, Au nanoclusters and, also in disperse form, a substrate with a surface functionalized with a polyelectrolyte that confers a net electric charge thereon, and in intensely agitating said solution to affix Au nanoclusters to the substrate surface. This results in a substrate that has a surface with Au nanoclusters affixed in disperse form, significantly without clusters. The
(Continued)

invention also relates to a catalyst that comprises said substrate with Au nanoclusters affixed to the surface thereof. Said catalyst is particularly suitable for use in oxidation reactions.

10 Claims, 2 Drawing Sheets

(51) Int. Cl.
  *B01J 23/52* (2006.01)
  *B82Y 30/00* (2011.01)
  *B01J 37/03* (2006.01)
  *B01J 35/00* (2006.01)
  *B01J 37/00* (2006.01)
  *B82Y 40/00* (2011.01)
  *B01J 21/18* (2006.01)
  *B01J 35/04* (2006.01)

(52) U.S. Cl.
  CPC ....... *B01J 35/0013* (2013.01); *B01J 37/0072* (2013.01); *B01J 37/0201* (2013.01); *B01J 37/035* (2013.01); *B01J 37/343* (2013.01); *B82Y 30/00* (2013.01); *B01J 21/185* (2013.01); *B01J 35/04* (2013.01); *B82Y 40/00* (2013.01)

(58) Field of Classification Search
  CPC ....... B01J 37/035; B01J 35/002; B01J 23/52; B01J 35/04; B01J 21/185; B82Y 30/00; B82Y 40/00
  USPC ........................................................ 502/5
  See application file for complete search history.

(56) References Cited

OTHER PUBLICATIONS

Wang et al. "Polyelectrolyte functionalized carbon nanotubes as a support for noble metal electrocatalysts and their activity for methanol oxidation" Nanotechnology, vol. 19, No. 26, May 20, 2008.*

Machine translation of CN 102107851, Jun. 29, 2011.*

Jui-Ming Yeh et al., "Noncovalent Interaction between Gold Nanoparticles and Multiwalled Carbon Nanotubes via an Intermediatory", Journal of Nanotechnology, vol. 2009, 2009, pp. 1-7.

Kuiyang Jiang et al., "Selective Attachment of Gold Nanoparticles to Nitrogen-Doped Carbon Nanotubes", Nano Letters, vol. 3, No. 3, Mar. 2003, pp. 275-277.

Leonor Alves et al., "Synthesis and Stabilization of Subnanometric Gold Oxide Nanoparticles on Multiwalled Carbon Nanotubes and Their Catalytic Activity", J. Am. Chem. Soc., 2011, vol. 133, No. 26, pp. 10251-10261.

International Search Report, PCT/ES2012/070722, dated Jan. 30, 2013, 4 pages.

* cited by examiner

PROCEDURE FOR OBTAINING A SUBSTRATE WITH AU NANOCLUSTERS ATTACHED TO ITS SURFACE, AND THE SUBSTRATE AND CATALYST OBTAINED THROUGH THIS PROCEDURE

REFERENCE TO RELATED APPLICATIONS

This application is a U.S. national stage application of International Patent Application No. PCT/ES2012/070722, filed Oct. 17, 2012, and claims the benefit of priority of Spanish Application No. P201131660, filed Oct. 17, 2011, the entire disclosures of which are incorporated herein by reference.

FIELD OF THE INVENTION

The invention is in the field of synthesis procedures for Au (gold) nanoclusters and catalysts formed by Au nanoclusters.

More specifically, the invention covers a procedure for obtaining a substrate with Au nanoclusters attached to its surface, as well as a substrate and a catalyst obtained through this procedure.

STATUS OF THE TECHNIQUE

It is known that Au nanoclusters exhibit extraordinary catalytic properties, and hence there is great interest in developing procedures for obtaining Au nanocluster compositions with structures suitable for use as catalysts.

The main difficulty in obtaining such Au nanocluster compositions is preventing nanoclusters aggregating and forming larger particles. This problem is significant because, as it is known, particles larger than 3-10 nm are considerably less reactive and thus exhibit fewer catalytic properties than smaller nanoclusters.

Various methods have been proposed to control the growth of developing nanoclusters and prevent them aggregating into larger particles. Procedures based on chemical processes consist of carrying out the process of formation and growth of nanoclusters in a solution with a stabilising agent. The main drawback of these procedures in regards to obtaining catalysts is that the stabilising agent coats the surface of the nanoclusters and consequently inhibits its catalytic capacity to a significant degree. This problem is not present in procedures based on physical or physicochemical processes such as metal evaporation under ultra-high vacuum conditions. However, these procedures are difficult to implement on an industrial scale.

Document WO2010031890A1 proposes a procedure which involves using a carbon nanotube substrate to which Au nanoclusters attach to its surface. To achieve this effect, the carbon nanotubes are coated with a compound containing amino groups and the coated nanotubes are placed in an aqueous solution containing Au captions and a reducing agent. Stabilisation of the Au nanoclusters on the surface of the nanotubes is achieved through a reduction induced by the amino groups present on the surface coating. The advantage of this procedure is that the resulting end product is a carbon nanotube substrate with a great versatility of application because it can be used as a dispersed catalyst as or as the coating for a support surface. However, as stabilisation of the nanoclusters is achieved through a chemical process it has the aforementioned drawbacks.

i. The article "Sonochemical Synthesis of Highly Fluorescent Ag Nanoclusters", Huangxun Xu et al., ACSNANO Vol. 4 No. 6, p. 3209-3214, 2010, outlines a process in which a synthesis of Ag (silver) nanoclusters is achieved through ultrasonication, with an aqueous solution with Ag+ cations subjected to ultrasound. A stabiliser dissolved in the aqueous solution is used to prevent aggregation of the nanoclusters into larger particles. In this case the stabiliser is a polyelectrolyte of sodium salt of polymethacrylic acid (PMAA). It is noteworthy that this procedure does not provide a composition of nanoclusters attached to a substrate, but rather an aqueous solution in which the nanoclusters are dispersed. It is also noteworthy that this procedure exclusively concerns the formation of Ag nanoclusters, unlike the present invention which concerns the formation of Au nanoclusters whose physical-chemical properties are quite different.

SUMMARY OF THE INVENTION

The invention aims to provide a process for producing a substrate with Au nanoclusters attached to its surface, which has the advantage mentioned above in regards to document WO2010031890A1 that the resulting product is a substrate with great application versatility but without the drawbacks typical of procedures based on chemical processes.

To achieve this purpose the procedure has been developed according to the invention, which is characterised in that it involves:

preparing a solution with dispersed Au nanoclusters as well as a dispersed form of a substrate whose surface is functionalised with a polyelectrolyte which gives it a net electrical charge; and subjecting this solution to intense agitation in order to cause Au nanoclusters to attach to the surface of the substrate.

This process according to the invention produces a substrate with Au nanoclusters attached to its surface that is particularly suitable for use as a powerful catalyst for oxidation reactions, as the Au nanoclusters are uncovered and distributed over the surface of a substrate without the significant formation of agglomerations.

The intensive agitation of the solution in order to cause Au nanoclusters to attach to the surface of the substrate should preferably be performed by subjecting the solution to ultrasonication.

Preferably, the process according to the invention should include a previous step of Au nanocluster formation carried out by subjecting a solution including at least one Au precursor and a polyelectrolyte to ultrasonication.

Preferably, the substrate should comprise one or several nanostructured materials, in particular carbon nanotubes or inorganic oxide nanoparticles such as $TiO_2$, $Fe_2O_3$, $SiO_2$ or $CeO_2$.

Preferably, the solution that is subjected to intense agitation in order to cause Au nanoclusters to attach to the surface of the substrate should contain a weight in Au nanoclusters of between 0.1% and 10% with respect to the weight of the substrate.

In some embodiments, after the solution has been subjected to intense agitation in order to cause the Au nanoclusters to attach to the substrate surface, a treatment is applied to separate the substrate with Au nanoclusters attached to its surface from the solution through either drying, filtration or lyophilising of the solution, with the resulting substrate being comprised of loose powder. These separation processes produce a powder suitable for use as a solid dispersed catalyst.

In some embodiments, after the solution has been subjected to intense agitation in order to cause the Au nanoclusters to attach to the substrate surface, a treatment is applied to separate the solution from the substrate with Au nanoclusters attached to its surface. The treatment involves the application of a suspension containing the substrate to the surface of the support material, where the final result is a support material with the substrate attached to its surface. This separation process yields a material suitable for use as a solid catalyst supported on material and that can be applied efficiently because the Au nanoclusters are attached to a nanostructured substrate.

The invention also includes a substrate with Au nanoclusters attached to its surface that can be obtained through the previously described procedure according to the invention and which is characterised in that the Au nanoclusters are dispersed without being significantly agglomerated on the surface of the substrate. Preferably, the substrate should comprise one or several nanostructured materials, in particular carbon nanotubes or inorganic oxide nanoparticles such as $TiO_2$, $Fe_2O_3$, $SiO_2$ or $CeO_2$.

In some embodiments, the substrate with Au nanoclusters attached to its surface is in loose powder form, suitable for use as a solid dispersed catalyst, while in other embodiments it is attached to the surface of a support material suitable for use as a solid catalyst supported on a material.

The invention also includes a catalyst characterised in that it includes the substrate with Au nanoclusters attached to its surface, according to the invention. This catalyst is particularly suitable for use in CO oxidation reactions, amines elimination reactions achieved through the oxidation of the same, thiols elimination reactions and oxidation reactions of volatile organic compounds, preferably ethylene.

EXAMPLES OF EMBODIMENTS

Example 1

The following describes in a non-limitative way an example of the embodiment of the invention.

The formation of Au nanoclusters occurs at an earlier stage consisting of ultrasonication (submitting to ultrasound) of an aqueous solution whose solutes are a precursor to Au and a polyelectrolyte. The Au precursor is tetrachloroauric acid ($HAuCl_4$) and the polyelectrolyte precursor is the sodium salt from polymethacrylic acid (PMAA). The resulting solution has a final gold concentration of 0.02 mg/ml. The molar ratio between gold and the PMAA carboxylate groups is 2. The pH of the solution is adjusted to 4.5 by the addition of nitric acid ($HNO_3$), and the oxygen dissolved in the solution was eliminated by bubbling argon gas for 30 minutes. After the oxygen is removed from the solution, it is ultrasonicated for about 20 minutes with a Branson 250D probe sonicator operated at 200 W to form Au nanoclusters. The volume of the solution is 100 ml.

As a result of this previous stage, an aqueous solution of Au nanoclusters with a concentration of 0.02 mg of Au nanoclusters per ml of aqueous solution is obtained.

Figure 1:
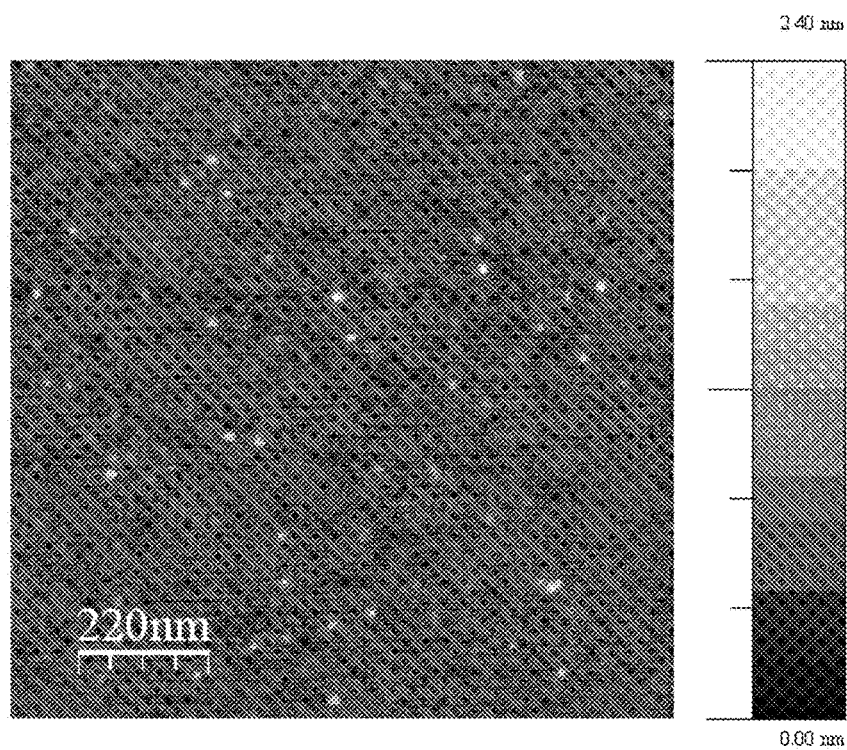
FIG. 1 is an atomic force microscopy image showing Au nanoclusters obtained during a previous stage of the process according to the invention, wherein the nanoclusters are formed from Au through the ultrasonication of an aqueous solution whose solutes are an Au precursor and a polyelectrolyte.

FIG. 1 shows an atomic force microscopy image of the Au nanoclusters obtained, having been placed on a mica surface in order to capture the image. Numerous gold nanoclusters are clearly visible on the mica surface.

A solution is then prepared which contains the dispersed Au nanoclusters formed in the previous step and a dispersed substrate whose surface is functionalised with a polyelectrolyte which gives it a net electric charge. In this example of embodiment, the substrate is comprised of carbon nanotubes, and the polyelectrolyte used to functionalise the surface of the substrate is polyallylamine.

The functionalised carbon nanotubes with polyallylamine are prepared using the following protocol. A suspension of carbon nanotubes is prepared in a 1% aqueous solution of polyallylamine hydrochloride to achieve a concentration of 1 mg of carbon nanotubes per ml of aqueous solution. The suspension is dispersed using an ultrasonic Branson 250D probe sonicator operated at 250 W for 30 minutes to ensure that the carbon nanotubes are suspended individually. The volume of the solution is 100 ml.

This aqueous solution of carbon nanotubes is mixed with the aqueous solution of Au nanoclusters obtained in the previous step, in a proportion wherein the weight ratio between the Au nanoclusters and the carbon nanotubes is 1% in Au with respect to carbon nanotubes.

While this mixture, comprising the solution of Au nanoclusters in dispersed form and the carbon nanotube substrate whose surface is functionalised with a polyelectrolyte which gives it a net electrical charge is prepared, ultrasonication of the solution is performed for 15 minutes with a 250D probe sonicator operated at 100 W. The ultrasonication causes dispersion of the Au nanoclusters on the surface of carbon nanotubes, facilitating the attachment of Au nanoclusters to the surface without forming agglomerates due to the polyelectrolyte that gives it a net electrical charge. This process yields a final aqueous solution of carbon nanotubes with Au nanoclusters attached to its surface.

Finally, a separation stage is implemented to separate the carbon nanotubes with Au nanoclusters attached to their surface from this final solution. The separation is achieved through filtration using a vacuum filter. Alternatively, the separation can be carried out through drying or lyophilisation with equivalent results: a powder consisting of carbon nanotubes with fixed Au nanoclusters on its surface.

Optionally, to increase the efficiency of the process for attaching the Au nanoclusters to the substrate surface (metal-substrate interaction process) ultrasonication of the solution should be simultaneously or sequentially accompanied by a thermal treatment in which the temperature of the substrate with Au nanoclusters anchored to its surface rises to between 200° C. and 400° C.

Figure 2:
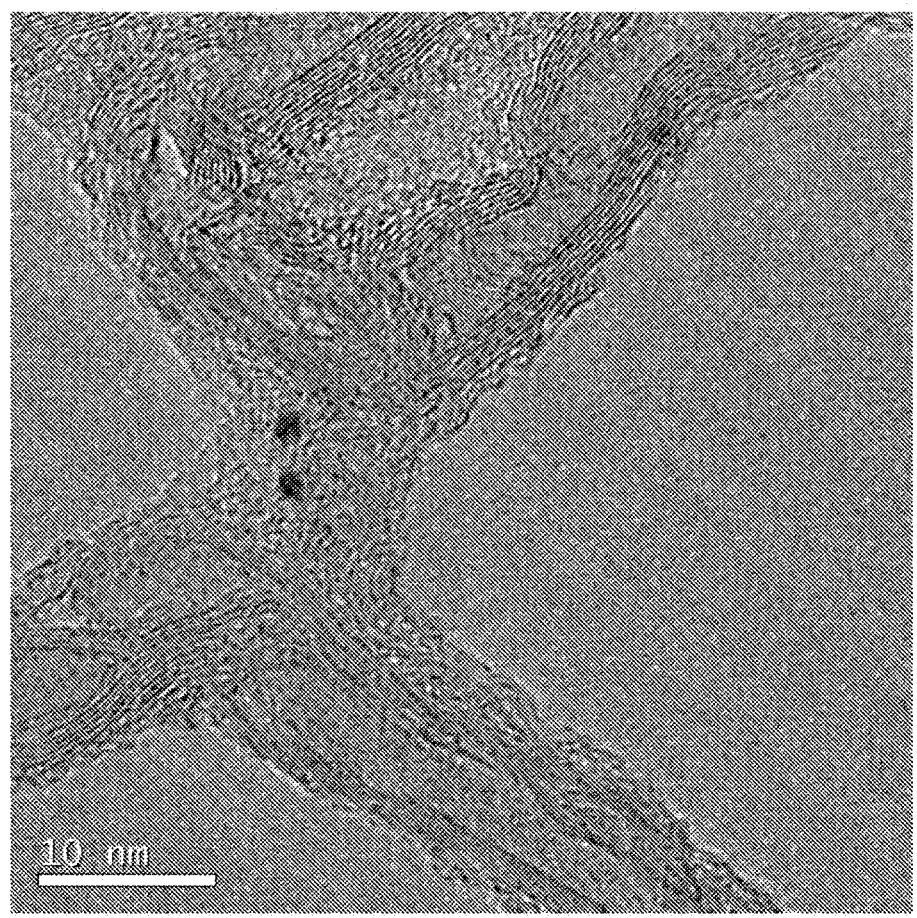
FIG. 2 is an image of a transmission electron microscope showing a detailed area of the powder product obtained as the end result of the procedure according to the invention, wherein the Au nanoclusters are supported on the carbon nanotube surface.

FIG. 2 is a transmission electron microscopy image showing a detailed area of the powder obtained. As shown, the Au nanoclusters are attached to the surface of the carbon nanotubes. The nanoclusters are visible as dark spots on the graphitic structure of the carbon nanotubes. It should be noted that the number of nanoclusters in the image is not large as they are deposited in a small proportion, which in this example is 1% by weight.

Example 2

Following the same procedure than Example 1 described above, with the only difference that the final stage, the separation of the carbon nanotubes with the attached Au nanoclusters on the surface from the solution, is made of differently.

Starting from the already described final solution obtained with the synthesis process or preparing from this solution another solution or suspension of carbon nanotubes with Au nanoclusters in a solvent such as water, ethanol or any other compatible solvent at a concentration typically 0.5 mg/ml. This solution or slurry is impregnated into the surface of a support material preferably porous, which in this example is formed of a porous ceramic monolith, as an example one of those used in automobile catalytic converters. The final support material is obtained after performing a drying operation to evaporate the solvent, performed for example in an oven at a temperature typically of 60° C. In this case, the material is formed by the porous ceramic monolith with the carbon nanotubes with Au nanoclusters attached on its surface. Thus, the final product is not a carbon nanotube powder with Au nanocluster as in Example 1, but a porous support material to the surface of which are fixed the carbon nanotubes with Au nanoclusters. These carbon nanotubes are equivalent to those shown in FIG. 2 discussed in Example 1, with the only difference that, instead of being in powder form, are fixed to the support material consisting of a porous ceramic monolith. Both the product obtained in Example 1 and Example 2 are advantageously applicable as catalysts in oxidation reactions. The choice between any of them depends on whether a catalyst is required in powder form, as in Example 1, or a fixed on a catalyst support material as in Example 2.

The invention claimed is:

1. A procedure for obtaining a substrate with Au nanoclusters attached to its surface, characterised in that it involves:
   preparing a solution with dispersed Au nanoclusters as well as a dispersed form of a substrate whose surface is functionalised with a polyelectrolyte which gives it a net electrical charge; and
   subjecting said solution to agitation in order to cause Au nanoclusters to attach to the surface of the substrate;
   wherein the substrate comprises inorganic oxide nanoparticles, and
   wherein the inorganic oxide comprises $Fe_2O_3$.

2. The procedure according to claim 1, characterised in that the agitation of the solution intended to cause Au nanoclusters to attach to the surface of the substrate is performed by subjecting the solution to ultrasonication.

3. The procedure according to claim 1, characterised in that it includes a prior stage of Au nanocluster formation carried out by subjecting a solution comprising at least one precursor of Au and a polyelectrolyte to ultrasonication.

4. The procedure according to claim 1, wherein said solution, which is subjected to agitation to provoke the Au nanoclusters to attach to the substrate surface, contains a weight in Au nanoclusters of between 0.1% and 10% with respect to the weight of the substrate.

5. The procedure according to claim 1, characterised in that, after the solution has been subjected to agitation in order to cause the Au nanoclusters to attach to the substrate surface, a treatment is applied to separate the solution from the substrate with Au nanoclusters attached to its surface either through drying, filtration or lyophilising of the solution, with the resulting substrate being comprised of loose powder.

6. The procedure according to claim 1, characterised in that, after the solution has been subjected to agitation in order to cause the Au nanoclusters to attach to the substrate surface, a treatment is applied to separate the solution from the substrate with Au nanoclusters attached to its surface through the application of a suspension containing the substrate to the support material surface, where the final result is a support material with the substrate attached to its surface.

7. The procedure according to claim 1, characterised in that the action of subjecting the solution to agitation in order to cause Au nanoclusters to attach to the substrate surface is accompanied, simultaneously or sequentially, by a thermal treatment in which the temperature rises to between 200° C. and 400° C.

8. The procedure of claim 1 wherein: the procedure has a prior stage of Au nanocluster formation carried out by subjecting a precursor solution comprising at least one precursor of Au and a polyelectrolyte to ultrasonication; the agitation of the solution intended to cause Au nanoclusters to attach to the surface of the substrate is performed by subjecting the solution to ultrasonication; the substrate comprises one or more of the nanostructured materials; the solution which is subjected to agitation to provoke the Au nanoclusters to attach to the substrate surface contains a weight in Au nanoclusters of between 0.1% and 10% with respect to the weight of the substrate; the subjecting the solution to agitation in order to cause Au nanoclusters to attach to the substrate surface is accompanied, simultaneously or sequentially, by a thermal treatment in which the temperature rises to between 200° C. and 400° C.

9. The procedure of claim 1 wherein the inorganic oxide consisting of $Fe_2O_3$.

10. The procedure of claim 1 wherein the inorganic oxide comprises $CeO_2$.

* * * * *